United States Patent [19]

Periou

[11] Patent Number: 4,918,998
[45] Date of Patent: Apr. 24, 1990

[54] MOTOR-SPEED REDUCER DEVICE INCLUDING SAFETY MEANS FOR DRIVING AN ELEMENT

[75] Inventor: Pierre Periou, Cergy Pontoise, France

[73] Assignee: Rockwell-CIM, France

[21] Appl. No.: 267,868

[22] Filed: Nov. 7, 1988

[30] Foreign Application Priority Data

Nov. 23, 1987 [FR] France .................. 87 16211

[51] Int. Cl.⁵ .............................................. G01L 3/14
[52] U.S. Cl. ................................ 73/862.34; 73/862.31
[58] Field of Search ........... 73/862.31, 862.33, 862.34; 74/411

[56] References Cited

U.S. PATENT DOCUMENTS 3,208,298  9/1965  Pickles ............................ 74/411
4,592,241  6/1986  Obayashi et al. .............. 73/862.34

FOREIGN PATENT DOCUMENTS 166057  12/1905  Fed. Rep. of Germany ... 73/862.34

Primary Examiner—Charles A. Ruehl

[57] ABSTRACT

A motor-speed reducer includes a driving input shaft, an output shaft and a deformable coupling coupling the input shaft to the output shaft. The coupling includes a worm and a speed reducer driven by the worm. A sensor is also provided for detecting torque between the input shaft and the output shaft during operation of the device which causes deformation of the coupling. The sensor includes two electrically conductive tracks. One track is associated with an input side of the coupling and the other track is associated with an output side of the coupling. An electrical circuit is connected to the tracks and monitors movement of each track to detect a change in torque as a function of a change in the movement of one of the electrically conductive tracks relative to the other track.

5 Claims, 3 Drawing Sheets

MOTOR-SPEED REDUCER DEVICE INCLUDING SAFETY MEANS FOR DRIVING AN ELEMENT

The present invention relates to a motor-speed reducer device comprising a driving input shaft, a coupling for coupling said shaft to an output shaft and provided with a worm and a speed reducer driven by said worm.

Such a device may be employed in many applications and in particular in motor vehicles for driving opening means (window raisers, sliding roofs, etc.) by means of a switch which does not need a constant pressure of the finger on the switch.

This requires a control of the position and of the force for shifting the opening means throughout the duration of the displacement of the latter.

Several solutions are known for detecting the position of the opening means: thus the number of rotations of the input shaft of the motor-speed reducer may be counted, or there may be used the cooperation of a brush with an electrically conductive strip fixed to the shaft of the armature, or a photo-diode and a photo-transistor associated with a notched wheel fixed to the shaft of the armature, or a magnet fixed to the end of the shaft and cooperating with a coil of an electrical circuit.

Now, there is no relation between the force supplied and the driving parameters (variation in the speed or the current in the transitional conditions of operation) owing to the inertia of the moving parts, which constitutes a definite drawback.

Indeed, if the critical value detected before the arrival of the opening means at a position of abutment is due, for example, to the presence of a foreign body such as the head or the hand of a passenger of the vehicle, the delay in the detection of this abnormal situation is liable to cause injury to this person.

An object of the invention is therefore to provide a motor-speed reducer device of the aforementioned type which detects an abnormal resistance of the opening means which involves no loss of kinetic energy and delivers to the motor-speed reducer an instruction to stop and thereby markedly improves the safety of the device.

According to the invention, the motor-speed reducer device comprises a sensor of a torque appearing in operation between the input shaft and output shaft during which the rotation of the output shaft is delayed relative to the rotation of the input shaft under the effect of the deformation of the coupling produced by the force it transmits.

Thus, by placing the sensor on the downstream side of the motor, the overload due to the inertia of the motor is included in the measured parameter.

According to one embodiment of the invention, in which the speed reducer comprises an output worm gear wheel meshed with the worm, and a torque damper interposed between the output gear wheel and the output shaft (which is the usual configuration of motor-speed reducers employed for these purposes) and provided with an output element connected to rotate with said output shaft, the sensor comprises electrically conductive tracks which are interconnected and respectively fixed to the output gear wheel of the speed reducer and the output of the damper, and an electrical circuit including said tracks and capable of delivering a periodical signal representing the deformation of the damper, the frequency of said signal being on the order of the frequency of rotation of the output shaft.

Such a torque sensor is adapted to a low-frequency control, for example employing a few Hertz. In other cases, the specification may require a higher frequency for measuring the torque and the invention then provides means for decreasing the period of the measuring signal, as described hereinafter, by for example mounting the torque sensor on a rapidly rotating shaft, such as the armature shaft of the motor-speed reducer.

Further features and advantages of the invention will be apparent from the following description with reference to the accompanying drawings which illustrate several embodiments of the invention given by way of non-limitative examples.

Figure 1:
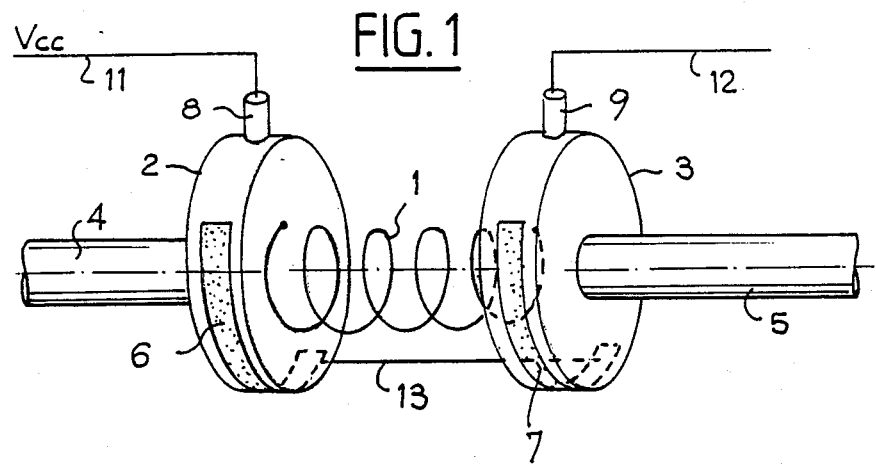
FIG. 1 is a perspective view of the principle of a sensor of the torque exerted on an elastic element inserted in a line of shafts.

FIG. 1 shows a principle of a torque sensor which measures the deformation of an elastic element constituted by a coil spring 1 whose ends are fixed to two cheeks 2,3 respectively fixed to the ends of an input shaft 4 and an output shaft 5. The two cheeks 2,3 are each provided with an electrically conductive track 6,7 which extends along a portion of the circumference of the supporting cheek 2,3 and associated with a fixed electrical contact 8,9 connected to a corresponding connection 11, 12 of an electrical measuring circuit. The tracks 6,7 are interconnected by a connection 13.

When the shafts 4,5 are under no load, the coupling spring 1 is not deformed and the brushes or studs 8,9 provide, for each rotation and in phase, the electric contact with the tracks 6,7 which are in the same angular position. The voltage obtained $V_{cc}$ (FIG. 2) as a function of the time t is in the form of successive pulses A.

When the device is under load, the shaft 5 which drives an element (not shown) is angularly delayed, or lags, relative to the driving shaft 4, the spring 1 deforms, the track 7 becomes angularly offset relative to the track 6 by a given angle. Consequently, the contacts 8,9 are in contact with the tracks 6,7 for each rotation of the shaft during a period of time which is less than the closing times of these contacts when the system operates under no load. Consequently, the signals B obtained (FIG. 2) have a width which is less than the widths of the signals A. The width of the signals $V_{cc}$ therefore decreases when the angular offset between the two shafts 4,5 increases owing to an increased resistance exerted on the shaft 5, which permits obtaining an electrical signal representing the magnitude of the torque exerted on the coupling spring 1.

Figure 3:
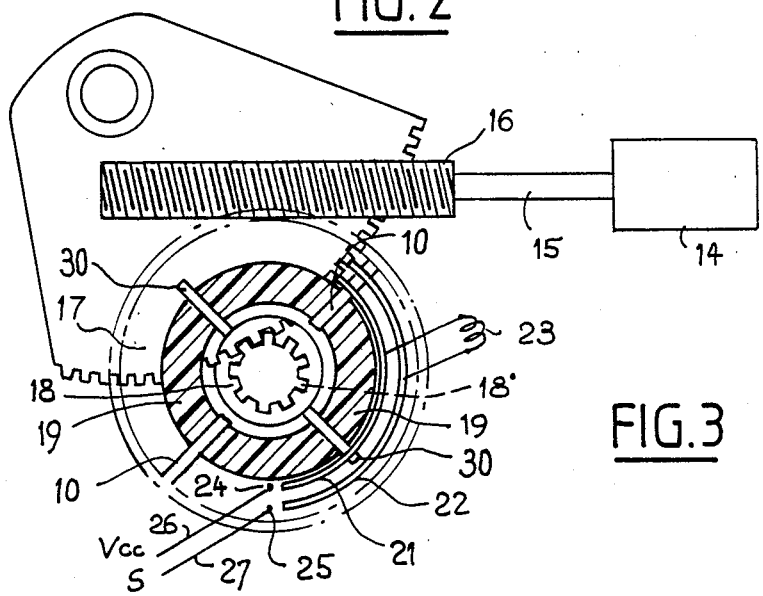
FIG. 3 is a simplified elevational view of a motor-speed reducer device provided with a torque sensor of a first embodiment of the invention.

FIG. 3 illustrates a first embodiment of a motor-speed reducer device provided with a torque sensor according to the invention.

This device comprises an electric motor 14 provided with an armature shaft 15 terminating in a worm 16 meshed with an output worm gear wheel 17 of the speed reducer and an output shaft 18 connected to rotate with a damper output element such as a pinion 18' as shown by phantom lines and engaging a toothed sector for operating or opening a window, as known per se. Damper blocks 19 are interposed between radial fins 10 rigid with the gear wheel 17 and radial fins 30 rigid with the damper output element and the output shaft 18.

The sensor of the torque exerted on the damper blocks 19 comprises electrically conductive tracks 21, 22 respectively connected to rotate with the output shaft 18 and the gear wheel 17 of the speed reducer. These tracks are interconnected by an electrical connection 23 and associated with fixed contacts 24,25 of an electrical circuit, respective connections 26,27 of which are shown.

Figure 2:
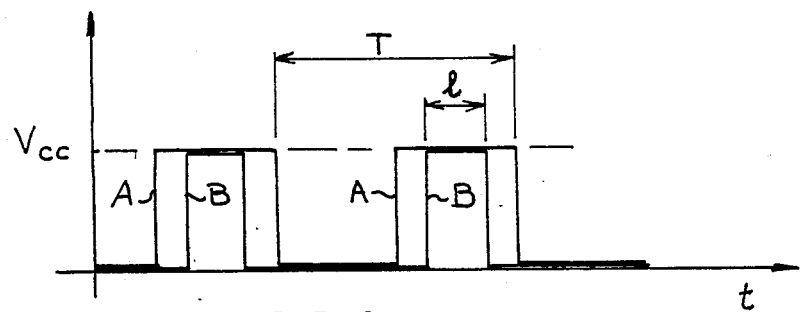
FIG. 2 is a diagram representing, as a function of time, the voltage signal obtained by the torque sensor shown in FIG. 1.

Square signals of the type shown in FIG. 2 are delivered by the electrical control circuit when the switches 24,21 and 25,22 are simultaneously closed under the action of the torque exerted on the elastic blocks 19. Such a sensor measures the torque with a frequency on the order of the frequency of rotation of the output shaft 18, which, in the case of an opening means of a vehicle, is relatively low (for example 1 Hz.).

Figure 4:
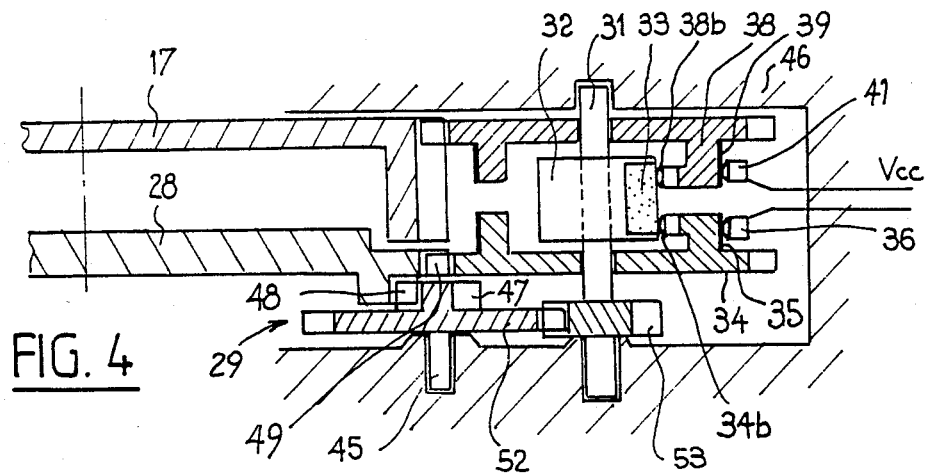
FIG. 4 is a partial axial sectional view of a second embodiment of a motor-speed reducer device according to the invention.
Figure 5:
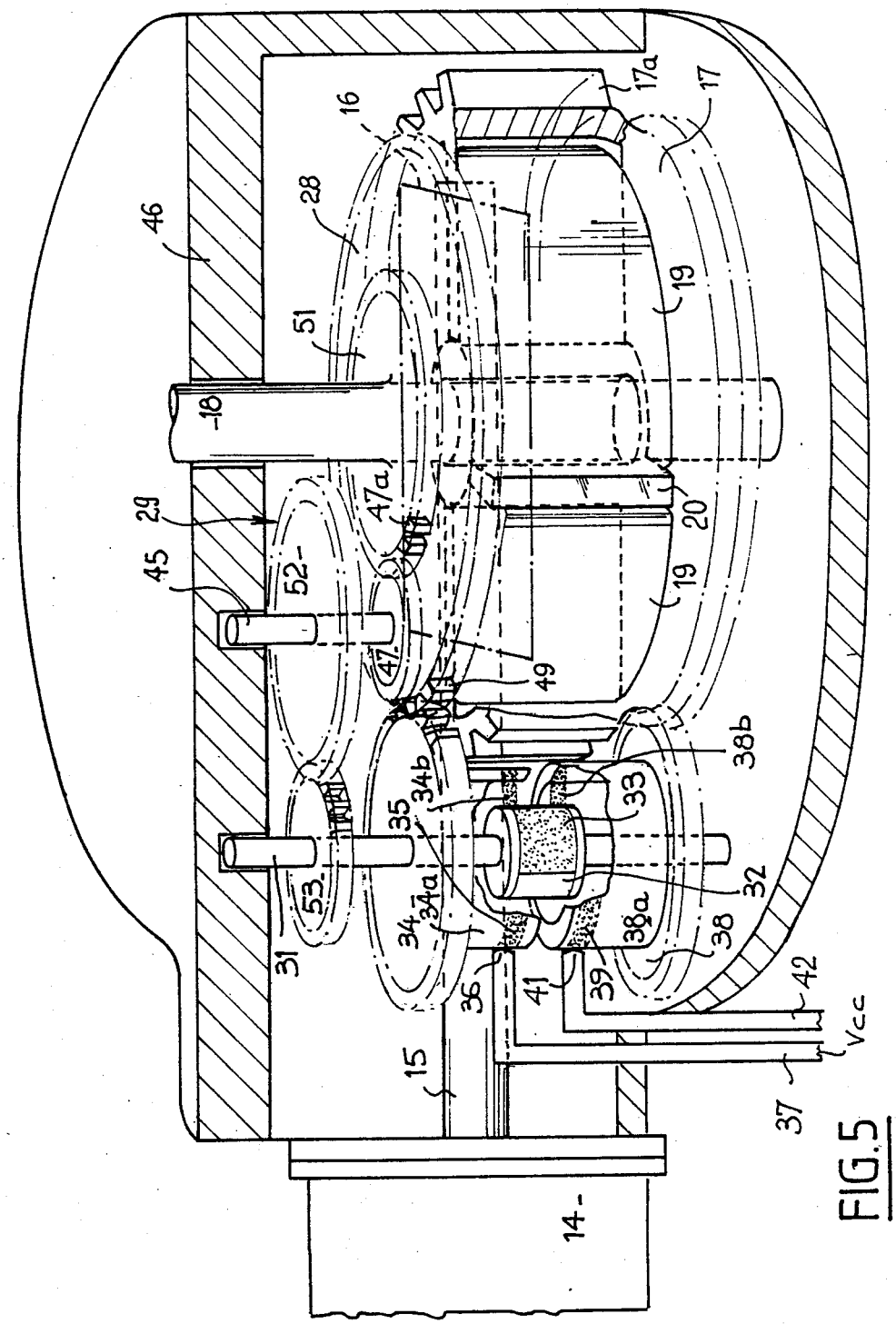
FIG. 5 is a perspective view to an enlarged scale of a variant of the motor-speed reducer device shown in FIG. 4.

The second embodiment of the torque sensor provided for the motor-speed reducer device according to the invention illustrated in FIGS. 4 and 5 permits considerably increasing the frequency of the control of the torque relative to the frequency of the embodiment of FIG. 3, which may be necessary in some cases. Indeed, in window glass raisers of a vehicle, for example, the output gear wheel rotates at a relatively low speed of about 100 rpm and the travel of the opening means is on the order of 450 mm for a complete raising of the window glass, which corresponds, as a function of the speed reducing ratio, to 4 to 10 rotations of the output gear wheel. One rotation of the output gear wheel therefore corresponds to, for example, 90 mm of the travel of the window so that a measuring of the torque for each rotation of this gear wheel is quite insufficient bearing in mind the specification or requirements in an application of this type. Consequently, the frequency of the counting must be increased and in practice a count must be made for each millimeter of the travel of the opening means, i.e. substantially at the speed of rotation of the armature shaft, which is possible with the device shown in FIGS. 4 and 5.

This device comprises, in the known manner, the motor 14, the armature shaft 15 carrying the worm 16 which meshes with the teeth 17a of the output worm gear wheel 17 of the speed reducer which is provided with radial partition walls 20. The elastic damper blocks 19 are placed between these partition walls and other partition walls (not shown) rigid with a damper output element constituted by a gear wheel 28 which is coaxial with the gear wheel 17 and the output shaft 18 and rigid with the latter.

The torque sensor comprises a system of gearing up and reversing gear wheels 29 coupled to the output element 28 of the damper and including a rotary shaft 31 parallel to the output shaft 18 and carrying a commutator 32 provided with an electrically conductive strip 33. The system 29 further comprises a gear wheel 34 also coupled to the output element 28, coaxial with the shaft 31 and provided with a conductive track 35 associated with a fixed brush 36 of an electrical connection 37.

The sensor further comprises a second gear wheel 38 coaxial with the shaft 31 in the same way as the gear wheel 34 and having the same diameter as the latter and meshed with the output gear wheel 17 of the speed reducer and provided with a circular track 39 associated with a fixed brush 41 of an electrical connection 42, which is connected together with the connection 37 to an electrical circuit (not shown). The shaft 31 carrying the commutator 32 extends freely through the gear wheels 34 and 38. The circular tracks 36,39 are placed on cylindrical parts 34a,38a rigid with the respective gear wheels 34,38 and coaxial with the latter. The tracks 35,39 are periodically in contact with the strip 33, which extends in a suitable angular sector of the commutator 32, through respective rubbing contacts 34b and 38b inside the gear wheels 34 and 38.

The ends of the shaft 31 are received in the wall of a housing 46 which contains all of the aforementioned component parts except the motor 14. The shaft 18 extends through this housing 46.

The system of gear wheels 29 is not arranged in the same way in FIGS. 4 and 5 which constitute two possible embodiments thereof.

In the device shown in FIG. 4, the system of gear wheels comprises a small gear wheel 47 which meshes with the teeth 48 on the output gear wheel 28 of the damper which are slightly set back from the outer teeth 49 of this gear wheel 28. In FIG. 5, the small gear wheel 47 meshes with teeth 47a of a gear wheel 51 which is coaxial with and connected to rotate with the output gear wheel 28, the diameter of this gear wheel 51 being such that the small gear wheel 47 can be placed between the teeth 47a and the teeth 49 of the gear wheel 28.

In the two gearing up and reversing systems, a large gear wheel 52 connected to rotate with a shaft 45 carrying the small gear wheel 47 meshes with a third small gear wheel 53 which is coaxial with the shaft 31 and connected to rotate with the latter.

The motor-speed reducer device and the torque sensor of FIGS. 4 and 5 operate in the following manner:

The worm 16 driven by the input shaft 15 drives in rotation the worm gear wheel 17 and the output shaft 18 through the blocks 19 and the output gear wheel of the damper. The gear wheel 17 drives the gear wheel 38 and its contact 38b rubbing against the strip 33, and the gear wheel 28 drives the gear wheel 34 and its contact 34b which also rubs against the strip 33. The gear wheels 47 and 52 are driven by the teeth 48 (FIG. 4) or the teeth 37a (FIG. 5) in the direction opposed to that of the rotation of the gear wheel 28, and the gear wheel 52 drives the end gear wheel 53 which therefore rotates in the same direction as the gear wheel 28 and the commutator 32. The latter therefore rotates in the direction opposed to the direction of rotation of the gear wheels 34,38 and their tracks 35, 39 which rotate in the direction opposed to the direction of rotation of the respective driving gear wheels 28 and 17. The system of gears 29 therefore provides a gearing up and a reversal of the rotation of the commutator 32 relative to the gear wheel 28 which increases the frequency of the counting of the torque in the region of the contacts 34b, 38b and the conductive strip 33 as a function of the gear ratio of the gear wheels 47, 52 and 53.

Figure 6:
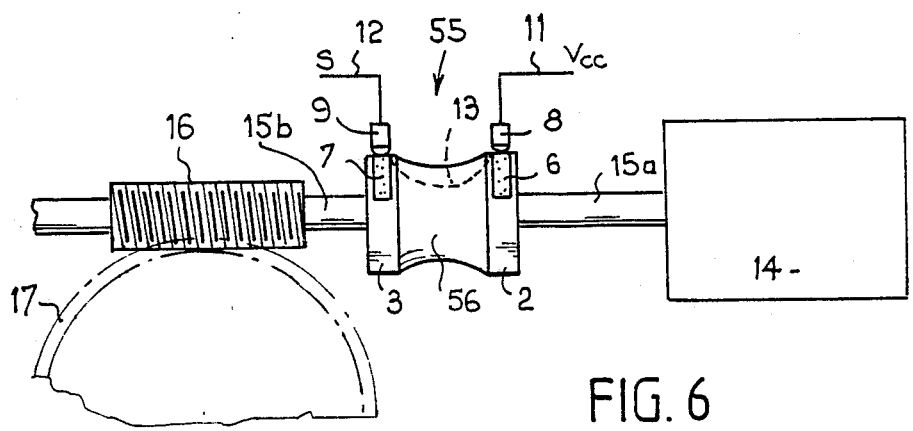
FIG. 6 is a simplified partial elevational view of a third embodiment of the motor-speed reducer device accorded to the invention.

In a third embodiment shown in FIG. 6, the torque sensor 55 is an elastic coupling between two parts 15a, 15b of the driving shaft, the part 15b carrying the worm 16. The coupling 55 comprises two cheeks 2, 3 which are rigidly connected to the confronting end parts of the shaft sections 15a and 15b, and an elastic block 56 whose faces are fixed to the confronting faces of the cheeks 2, 3. The latter carry a respective track 6, 7 connected through a connection 13 which extends through a given circular sector and capable of establishing the contact with a respective fixed brush 8,9 and corresponding connections 11, 12 of the electric torque control circuits.

This arrangement is therefore similar to that described with reference to FIG. 1. This embodiment permits, as the embodiment shown in FIGS. 4 and 5, measuring the deformation torque of the coupling 55 at a very high frequency, since this frequency is that of the rotation of the armature shaft 15a. In practice, it may be considered that one rotation of the armature shaft 15, 15a corresponds to a travel of about 1 mm of the controlled opening means, which permits measuring the torque sufficiently frequently and consequently bringing about an immediate stoppage of the motor if the presence of a foreign body opposes the closing of the opening means.

FIG. 2 shows the variable square signals of the dc voltage $V_{cc}$ which may also be obtained with the sensor shown in FIG. 6, having a period T and a width 1.

In a general way, for the various embodiments of the torque sensor described hereinbefore, the period T enables a suitable electronic circuit, known per se, comprising a suitable programmed microprocessor, to determine the speed and the position of the opening means. The ratio 1/T permits calculating the torque, and the electronic circuit is capable of giving, if need be, the instruction to immediately stop the motor 14 when a predetermined critical value of the torque is reached.

The invention is of utility in many applications, and the opening means of motor vehicles have only been given as a non-limitative example of the possible use of the invention.

I claim:

1. A motor-speed reducer device comprising: a driving input shaft, an output shaft, a deformable coupling coupling the input shaft to the output shaft, said coupling including a worm and a speed reducer driven by the worm, and a sensor for detecting torque between the input shaft and the output shaft during operation of the device and causing deformation of the coupling, said sensor including a pair of cheeks with each cheek fixed to an end of one of said input and output shafts, two electrically conductive tracks with each track extending along a portion of a circumference of one of said cheeks, a coil spring having one end attached to one of said cheeks and another end attached to the other cheek and an electrical circuit connected to said tracks and including means for monitoring the torque detected by said sensor.

2. A motor-speed reducer device comprising: an input shaft, an output shaft, a speed reducer including a worm driven by the input shaft and a worm gear wheel driven by the worm, a torque damper interposed between and coupling the worm gear wheel and the output shaft, said torque damper including an output element connected to rotate with the output shaft and a sensor for detecting torque between the input shaft and the output element of the damper, said sensor comprising a system of gearing up and reversing gear wheels coupled to the output element of the damper, including a rotary shaft carrying a commutator provided with an electrically conductive strip, a gear wheel coupled to the output element of the damper, said gear wheel being coaxial with the shaft carrying the commutator and provided with an electrically conductive first track and a first track rubbing contact means connecting the first track to the strip and an electrical connection associated with the first track, and a second gear wheel meshed with the output worm gear wheel of the speed reducer, said second gear wheel being coaxial with the shaft carrying the commutator and provided with an electrically conductive second track and a second track rubbing contact means connecting the second track to the strip and a second electrical connection associated with the second track, said electrical connections connecting said first and second tracks to an electronic circuit for calculating and controlling the torque and capable of delivering a periodical signal representing a deformation of the damper and a corresponding shift in phase between the speed of rotation of the gear wheel connected to the output element of the damper and the speed of rotation of the second gear wheel meshed with the output worm gear wheel of the speed reducer.

3. A motor-speed reducer device according to claim 2, wherein the two gear wheels connected to the output element of the damper and the output worm gear wheel of the speed reducer have the same diameter and the shaft carrying the commutator extends freely through the two gear wheels.

4. A motor-speed reducer device according to claim 2, wherein the system gear wheels comprise a small gear wheel and a large gear wheel connected to rotate with a common shaft, the small gear wheel meshing with a gear wheel which is part of the output element of the damper, and a third small gear wheel meshed with the large gear wheel and connected to rotate with the shaft carrying the commutator, whereby the commutator rotates in the same direction as the output worm gear wheel of the speed reducer and the output element of the damper and in the opposite direction to the two gear wheels drivenly connected to the output element of the damper and the output worm gear wheel of the speed reducer.

5. A structure comprising: in combination, an opening means of a motor vehicle, such as a window raiser or sliding roof, and a motor-speed reducer comprising a driving input shaft, an output shaft, a coupling coupling the input shaft to the output shaft and including a worm and a speed reducer drivenly engaged with the worm, said output shaft being drivenly connected to said opening means, a sensor for detecting torque between the input shaft and the output shaft during operation of the device and causing deformation of the coupling, said sensor including two electrically conductive tracks with one track associated with an input side of said coupling and the other track associated with an output side of said coupling and an electrical circuit connected to said tracks and including means for monitoring movement of each track and detecting a change in torque as a function of a change in the movement of one of said electrically conductive tracks relative to the other electrically conductive track.

* * * * *